United States Patent [19]
Yoshida

[11] Patent Number: 5,434,803
[45] Date of Patent: Jul. 18, 1995

[54] COORDINATE MEASURING MACHINE AND METHOD OF MEASURING THEREIN

[75] Inventor: Hitoshi Yoshida, Mitaka, Japan

[73] Assignee: Tokyo Seimitsu Co., Ltd., Tokyo, Japan

[21] Appl. No.: 35,585

[22] Filed: Mar. 23, 1993

[30] Foreign Application Priority Data

Mar. 26, 1992 [JP] Japan .................................. 4-068846
Mar. 9, 1993 [JP] Japan .................................. 5-048003

[51] Int. Cl.$^6$ ............................................. G01B 7/28
[52] U.S. Cl. ............................. 364/560; 364/474.05; 364/474.37; 33/503; 33/504; 73/1 J
[58] Field of Search .................... 364/560, 559, 474.05, 364/474.03, 474.25, 474.37; 33/502-504; 73/1 J

[56] References Cited

U.S. PATENT DOCUMENTS

| | | | |
|---|---|---|---|
| 4,982,504 | 1/1991 | Söderberg et al. | 33/502 |
| 5,019,993 | 5/1991 | Montalcini et al. | 364/474.37 |
| 5,027,281 | 6/1991 | Rekow et al. | 364/474.05 |
| 5,115,400 | 5/1992 | Watanabe et al. | 364/474.25 |
| 5,134,781 | 8/1992 | Baker | 73/1 J |

FOREIGN PATENT DOCUMENTS

| | | |
|---|---|---|
| 2197478 | 5/1988 | European Pat. Off. |
| 0275428 | 7/1988 | European Pat. Off. |
| 58-77612 | 5/1983 | Japan . |
| 3-189510 | 8/1991 | Japan . |
| 0482672 | 4/1992 | United Kingdom . |

*Primary Examiner*—Ellis B. Ramirez
*Assistant Examiner*—Hal D. Wachsman
*Attorney, Agent, or Firm*—Oliff & Berridge

[57] ABSTRACT

A coordinate measuring machine and the method of measuring therein wherein the instruction of the geometic shape is prevented from mistaking and the geometic shape of the workpiece is measured without interrupting the joystick operation. The measuring direction of the probe and the measured value of workpiece are taken in the data receiving part. The geometric shape calculation part calculates the errors of each geometric shape based on the measured value from the data receiving part and the formula which was input previously and represents the geometric shape such as "a straight line or circle". And, the geometric shape recognition part compares respective shape errors such as "a straight line and circle" which are calculated in geometic shape calculation part and recognizes the geometic shape having the lowest shape errors. Further, the optimal geometric shape is recognized again based on the geometric shape having the lowest recognized shape errors and the measuring direction of the probe which is input from said data receiving part. Therefore, the step for inputting the geometric shape of the workpiece by the key can be removed before measuring. Moreover, the geometric shape can be recognized in a short time, because the geometric shape of workpiece can be automatically set based on the characteristic such as "a point, straight line or circle" whenever the definite measured point of the geometric shape of the workpiece is obtained.

15 Claims, 10 Drawing Sheets

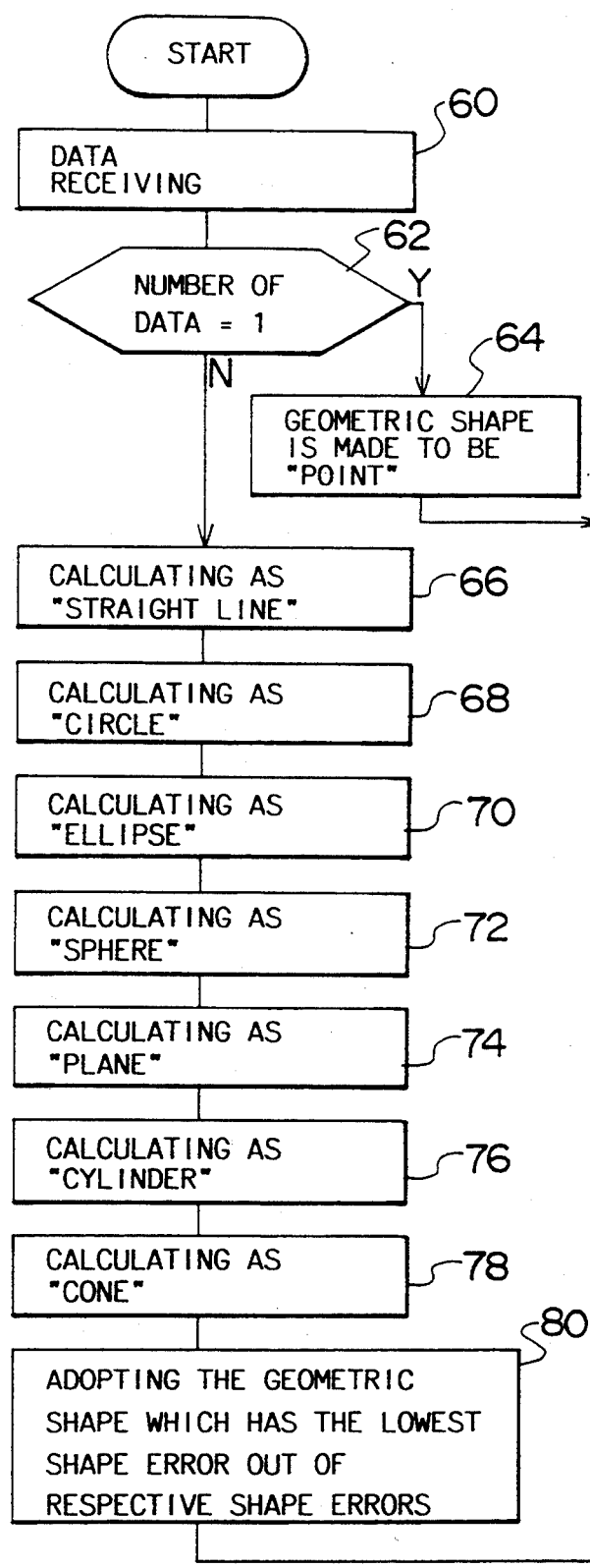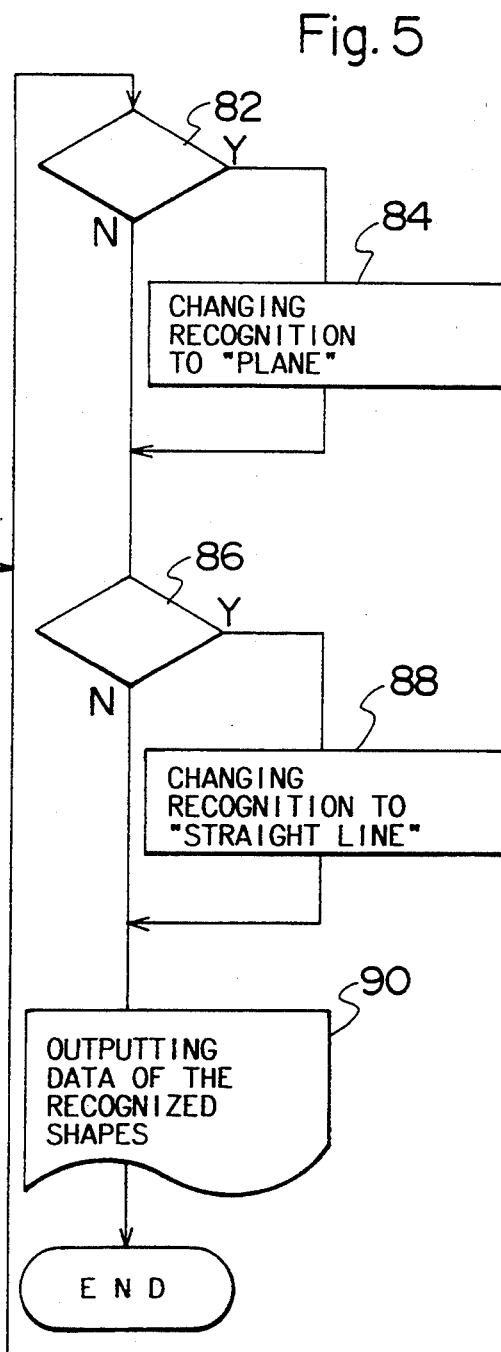
Fig. 5

$|L5 - r3| > r3/10 \cdots (9)$

COORDINATE MEASURING MACHINE AND METHOD OF MEASURING THEREIN

BACKGROUND OF THE INVENTION

1. Field of the Invention

This invention relates to a coordinate measuring machine and the method of measuring therein, and more particularly to a coordinate measuring machine and the method of measuring therein, where a probe is brought into contact with a workpiece to measure a shape thereof.

2. Description of the Related Art

When a 3-dimensions coordinate measuring machine is adapted to measure a workpiece, a geometric shape of the workpiece is selected from eight types of "a point, straight line, circle, ellipse, sphere, plane, cylinder or cone" to be input by the key. Then, the workpiece is measured by plural points. After the measure is completed, the execution key of the calculation is operated to measure the geometric shape of the workpiece based on the geometric shape which is input to the calculation part of the 3-dimensions coordinate measuring machine by the key and plural measured values.

However, in the conventional measuring method, it is necessary to select a geometric shape of the workpiece from eight types of "a point, straight line, circle, ellipse, sphere, plane, cylinder or cone" to be input by the key, whereby it was disadvantageous because a mistake could be made by the operator when inputting an instruction.

Moreover, when a 3-dimensions coordinate measuring machine are operated with the joystick, there is a problem that the joystick operation is interrupted because the operator releases the joystick lever when operating the key.

SUMMARY OF THE INVENTION

This invention has been developed to eliminate the above-described disadvantages and has as its aim the provision of a coordinate measuring machine and the method therefor wherein the mistaken instruction of the geometic shape is prevented and the geometic shape of the workpiece is measured without interrupting the joystick operation.

To achieve the above-described aim, according to the present invention, a coordinate measuring machine wherein a measuring element is brought into contact with a workpiece, which is rested on a table, to thereby measure the shape of said workpiece, comprising: a data receiving part for taking in the measuring direction of said measuring element and taking in a measured value when said measuring element is brought into contact with said workpiece; a geometric shape calculation part for calculating errors in respective geometric shapes on the basis of the measured value of said workpiece, which is input from said data receiving part, and respective formulae representing a plurality of geometric shapes which were previously input; a geometric shape recognition part for comparing shape errors in the respective geometric shapes, which are calculated in said geometric shape calculation part, to thereby recognize the geometric shape having the lowest shape errors, and further, recognizing again the optimal geometric shape on the basis of the geometric shape having the lowest shape errors which are recognized and the measuring direction of the measuring element, which is input from said data receiving part; and a data display part for displaying the geometric shape recognized in said geometric shape recognition part or data of the geometric shape thus recognized again.

Further, to achieve the above-described aim, according to the present invention, said geometric shape recognition part recognizes a geometric shape as "a point" when the measured value input from said data receiving part is one, compares to shape errors of at least two geometric shapes out of "a straight line, circle, ellipse, sphere, plane, cylinder and cone" to thereby recognize the geometric shape having the the lowest shape errors when the number of measured values thus input is plural, and further, recognizes again the optimal geometric shape on the basis of the geometric shape having the lowest shape errors, which is recognized, and the measuring direction of the measuring element, which is input from said data receiving part.

Moreover, to achieve the above-described aim, according to the present invention, said geometric shape calculation part performs the calculation of errors of the geometric shape on the basis of straightness, roundness, shape errors of "ellipse", sphericity, flatness, cylindricity or shape errors of "cone", respectively, when said geometric shape is "a straight line", "a circle", "an ellipse", "a sphere", "a plane", "a cylinder" or "a cone".

And, to achieve the above-described aim, according to the present invention, a coordinate measuring machine wherein a measuring element is brought into contact with the geometric shape of a workpiece, which is rested on a table, to obtain measured values of the geometric shape of said workpiece, and the geometric shape of said workpiece is measured on the basis of said measured values, comprising: a data receiving part for taking in the measured values and data of the moving direction of said measuring element which has moved for obtaining the measured values as new data whenever the measured values is obtained; a geometric shape recognition part for recognizing the geometric shape of the workpiece on the basis of the measured values, the existing data of the moving direction of the measuring element and said new data whenever said new data is input from said data receiving part; a geometric shape calculation part for selecting a formula of the geometric shape which is recognized from respective formulae representing a plurality of geometric shapes previously input on the basis of the recognized geometric shape, and calculating a shape of the recognized geometric shape on the basis of the selected formula; and a data display part for displaying the shape of the geometric shape which is calculated by said geometric shape calculation part.

Moreover, to achieve the above-described aim, according to the present invention, said geometric shape recognition part: recognizes the geometric shape as "a point" when the number of the definite measured values of the geometric shape of said workpiece is one; recognizes the geometric shape as "a point" or "a straight line" depending on the magnitude of a distance between the measured two points when the number of the definite measured values is two; recognizes the geometric shape of said workpiece as "a plane" or "a straight line" depending on the magnitude of an area of a triangle formed by three measured points and the magnitude of the angle made by a vector of the first and second measured points and a vector of the first and third measured points when the number of the definite measured values is three; recognizes again the geometric shape as "a plane" or "a circle" depending on the magnitude of an angle made by the moving direction of said measuring element at the time of measuring a third definite measured point and a normal line to "a plane" formed by the three measured points, when the geometric shape is recognized as "a plane"; recognizes again the geometric shape of "the plane" or "the circle" which is recognized at the time of measuring the three points as "a sphere" when a distance from "the plane" formed by the three measured points to a fourth definite measured point, which is measured newly, is larger than a predetermined value when the number of the definite measured values is four; recognizes again the geometric shape of "a circle" recognized when said three points are measured as "an ellipse" or "a circle" depending on whether a distance from the circumference of "a circle" formed by the three points to the fourth definite measured point is within a predetermined value when a distance from "the plane" to the fourth definite measured point is smaller than a predetermined value; recognizes again the geometric shape of "the sphere" recognized when the four points are measured depending on whether a distance from the spherical surface of "the sphere" formed by the four definite measured points to a fifth definite measured point which is newly measured is within a predetermined value when the number of the definite measured values is five; and recognizes again the geometric shape of "the cylinder" which is recognized when the four points are measured depending on whether a distance from the peripheral surface of "the cylinder" formed by the five definite measured points to a sixth definite measured point which is newly measured is within a predetermined value when the number of the definite measured points is six.

According to this invention, the measuring direction of the measuring element and the measured value when the measuring element comes in contact with the workpiece are taken in the data receiving part. The geometric shape calculation part calculates the errors of each geometic shape on the basis of the measured value of the workpiece from the data receiving part and a formula which was input previously and represents the geometric shape such as "a straight line, circle, ellipse, sphere, plane, cylinder or cone". Moreover, when the measured value from the data receiving part is one, a geometric shape is recognized as "a point" by the geometric shape recognition part. On the other hand, when said measured value is plural, shape errors of "straight line, circle, ellipse, sphere, plane, cylinder and cone" calculated in the geometric shape calculation part are compared each other and the geometric shape (i.e., the temporary geometric shape) having the lowest shape errors is recognized thereby. Further, the optimal geometic shape is recognized again on the basis of the geometric shape having the lowest shape errors, which is recognized, and the measuring direction of the measuring element, which is input from said data receiving part. And, the data display part displays the geometric shape recognized in the geometric shape recognition part or the data of the geometric shape thus recognized again.

As described above, the geometric shape of the workpiece is automatically set only by measuring the geometric shape of the workpiece such as "a point, straight line, circle, ellipse, sphere, plane, cylinder and cone" with a measuring element. Therefore, the steps for selecting the geometric shape of the workpiece from such as "a point, straight line, circle, ellipse, sphere, plane, cylinder and cone" and for inputting it by a key can be removed before measuring.

Moreover, according to this invention, when the definite measured point of the geometric shape of the workpiece is one, the geometric shape is recognized as "a point" by the geometric shape recognition part. When the definite measured point is two, the geometric shape is recognized as "a point" or "a straight line" depending on the magnitude of a distance between two measured points. Moreover, when the definite measured point is three, the geometric shape is recognized as "a plane" or "a straight line" depending on the magnitude of an area of triangle formed by three measured points and the magnitude of an angle made by a vector of the first and second measured points and a vector of the first and third measured points. And, when the geometric shape is recognized as "a plane", the geometric shape is recognized as "a plane" or "a circle" depending on the magnitude of an angle between the moving direction of the measuring element at the time of measuring the first measured point and a normal of "the plane" formed by three measured points. Moreover, when the definite measured point is four and a distance between "the plane" formed by three measured points and the fourth point, which is measured newly, is larger than a predetermined value, the geometric shape of "the plane" or "the circle" which is recognized at the time of measuring three points is recognized as "a sphere". And, when a distance from "the plane" to the fourth definite measured point is smaller than a predetermined value, the geometric shape of "the circle" which is recognized at the time of measuring three points is recognized again as "an ellipse" or "a circle" by the geometric shape recognition part depending on whether a distance from the circumference of "the circle" formed by the three definite measured points to the fourth definite measured point is within a predetermined value. Further, when the definite measured point is five, the geometric shape of "a sphere" which is recognized at the time of measuring four points is recognized again as "a cylinder" or "a sphere" by the geometric shape recognition part depending on whether a distance from the the spherical surface of the "the sphere" formed by the four definite measured points to the fifth definite measured point is within a predetermined value. Moreover, when the definite measured point is six, the geometric shape of "the cylinder" which is recognized at the time of measuring five points is recognized again as "a cone" or "a cylinder" by the geometric shape recognition part depending on whether a distance from the the circumference of "the cylinder" formed by the five definite measured points to the sixth definite measured point is within a predetermined value.

As described above, the geometric shape of the workpiece can be automatically set on the basis of the characteristic of the geometric shape of "the point, straight line, circle, ellipse, sphere, plane, cylinder and cone" whenever the definite measure point thereof is obtained. Therefore, the geometric shape can be recognized in a short time.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 5 is a flow chart to explain the first embodiment of the measuring method of the coordinate measuring machine according to the present invention.

DESCRIPTION OF THE PREFERRED EMBODIMENT

Detailed description will hereunder be given of the preferred embodiment of the coordinate measuring machine and the method of measuring therein according to the present invention with reference to the accompany drawing.

Figure 1:
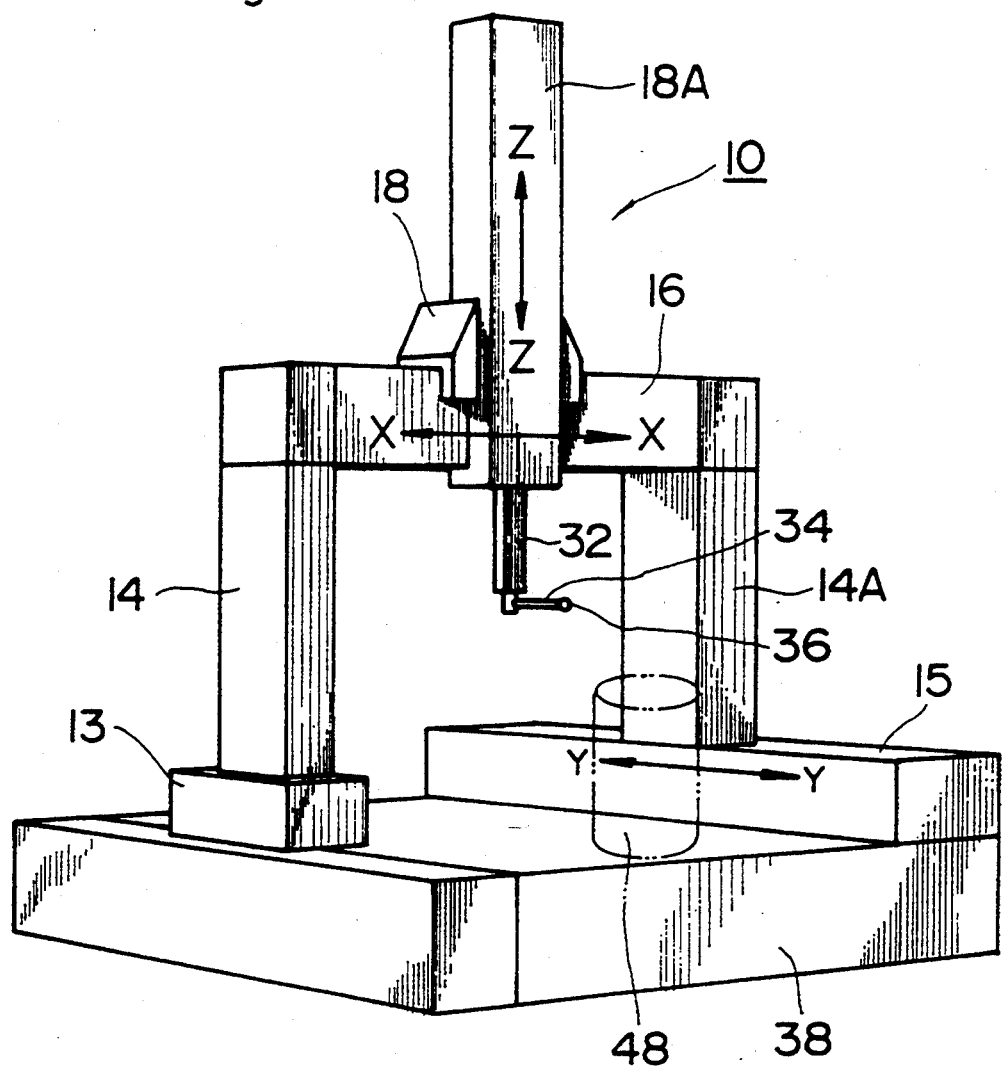
FIG. 1 is a perspective view showing the coordinate measuring machine according to the present invention.

A 3-dimensions coordinate measuring machine 10 is provided with a Y carriage 14 which is supported on a table 38 through air bearings 13 to be movable in a direction of Y-Y as shown in FIG. 1. A driver 15 of the Y carriage 14 is arranged under the bottom end portion of one column 14A of the Y carriage 14, and the Y carriage 14 moves in the direction of Y-Y by driving the driver 15. Moreover, an X-axis guide 16 is installed on the top end portion of the Y carriage 14 and the X carriage 18 is installed on the X-axis guide 16 to be movable in a direction of X-X. A Z carriage 32 is supported in a Z-axis guide 18A of the X carriage 18 to be movable in a direction of Z-Z. Moreover, a probe 36 is provided through a feeler 34 in the point end portion of the Z carriage 32. With this arrangement, the probe 36 can be moved in directions of three-axes of X, Y and Z. Therefore, the geometric shape of the workpiece 48 on the table 38 can be measured.

Figure 2:
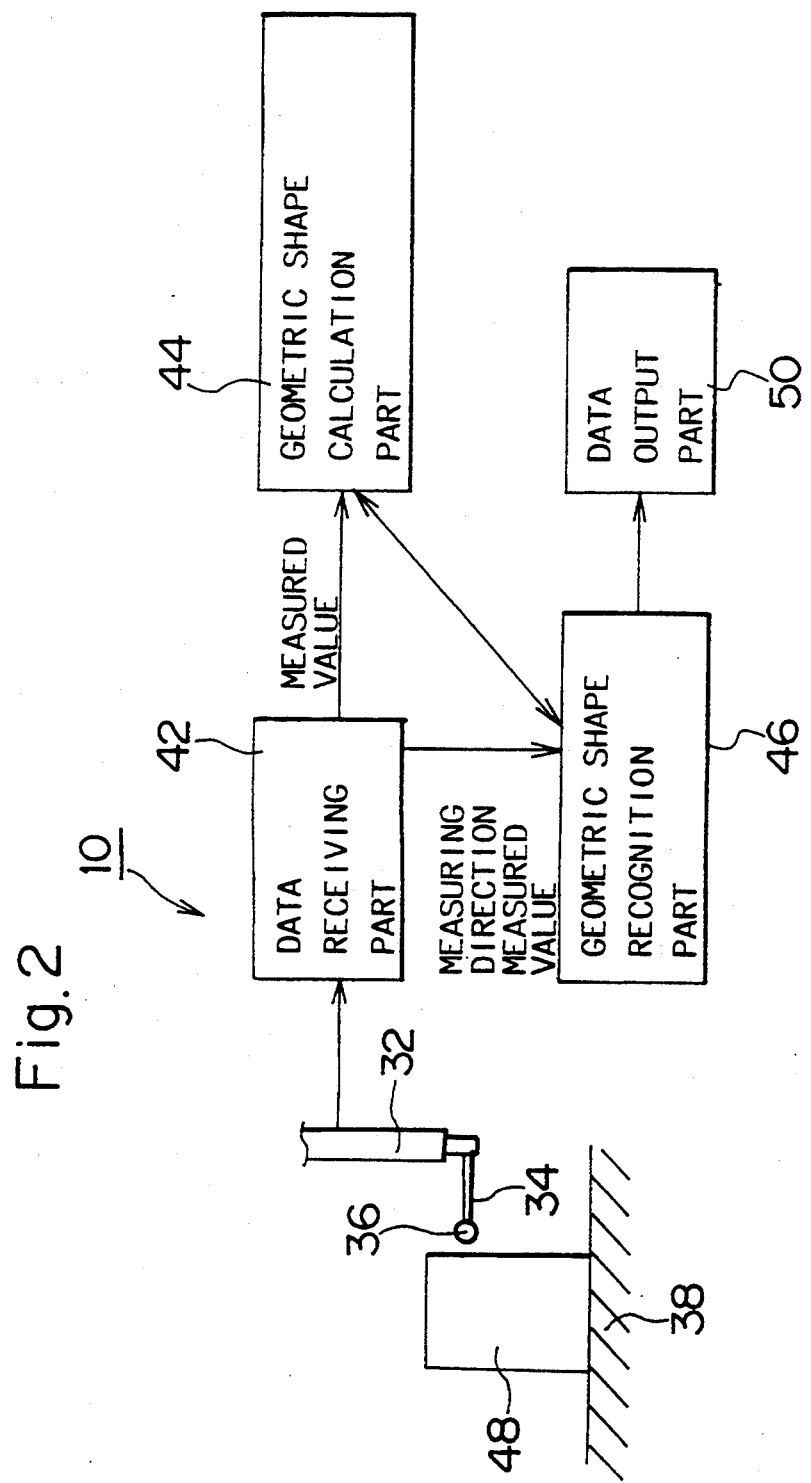
FIG. 2 is a block diagram of the coordinate measuring machine according to the present invention.

Moreover, the 3-dimensions coordinate measuring machine 10 is provided with a data receiving part 22, a geometric shape calculation part 44 and a geometric shape recognition part 46 as shown in FIG. 2. The data receiving part 42 detects the moving direction of the probe 36, and the contact position of the probe 36 when the probe 36 is brought into contact with the workpiece 48, that is, the measured value of the workpiece 48. The formulae which represent seven types of the geometric shape "a straight line, circle, ellipse, sphere, plane, cylinder and cone" are input previously in the geometric shape calculation part 44. Further, the measured value of the workpiece 48 is input from the data receiving part 42 to the geometric shape calculation part 44.

Respective geometric shape errors are calculated in the geometric shape calculation part 44 on the basis of the measured value of the workpiece 48 which is input from the data receiving part 42 and the formulae which were input previously and represent seven types of the geometric shape. Namely, the straightness (shape errors) of "straight line" calculated is memorized when the workpiece 48 is calculated as "a straight line". The roundness (shape errors) of "circle" calculated is memorized when the workpiece 48 is calculated as "a circle". Moreover, when the workpiece 48 is calculated as "an ellipse", "a sphere" or "a plane", the shape errors of "ellipse", the sphericity (shape errors) of "sphere" or the flatness (shape errors) of "plane", which is calculated individually, is memorized. Further, when the workpiece 48 is calculated as "a cylinder", the cylindricity (shape errors) is calculated and memorized. When the workpiece 48 is calculated as "a cone", the shape errors of "cone" is calculated and memorized. In this case, the respective shape errors of the geometric shapes are calculated by the method of least squares, the method of minimum area or the like. Further, when the measured value of the workpiece 48 is one, the geometric shape of the workpiece 48 is recognized as "a point".

Figure 3:
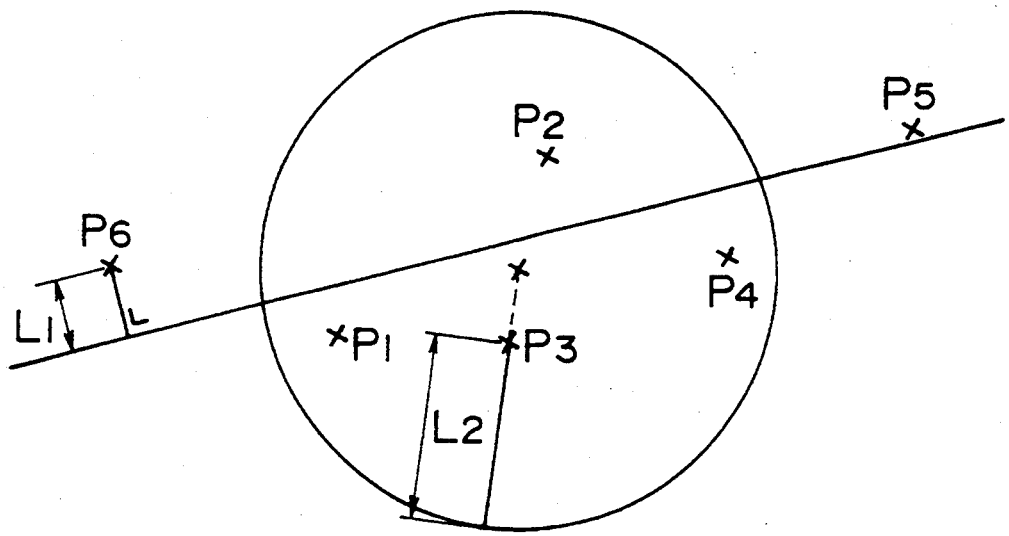
FIG. 3 is a explanatory drawing to explain the first embodiment of the measuring method of the coordinate measuring machine according to the present invention.
Figure 4:
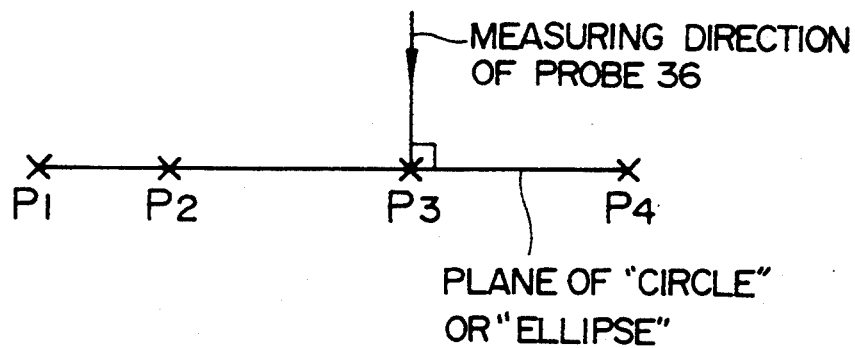
FIG. 4 is a explanatory drawing to explain the first embodiment of the measuring method of the coordinate measuring machine according to the present invention.
Figure 6:
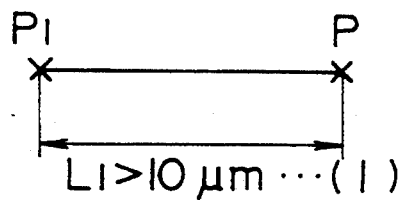
FIG. 6 is a explanatory drawing to explain the second embodiment of the measuring method of the coordinate measuring machine according to the present invention.
Figure 7:
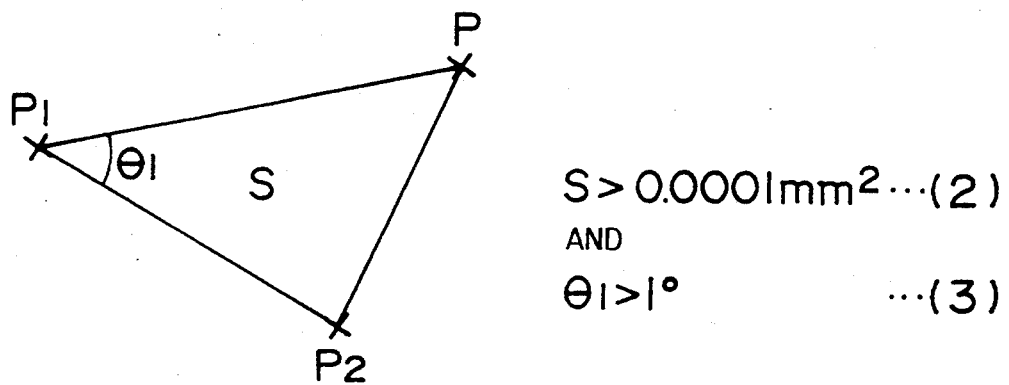
FIG. 7 is a explanatory drawing to explain the second embodiment of the measuring method of the coordinate measuring machine according to the present invention.
Figure 8:
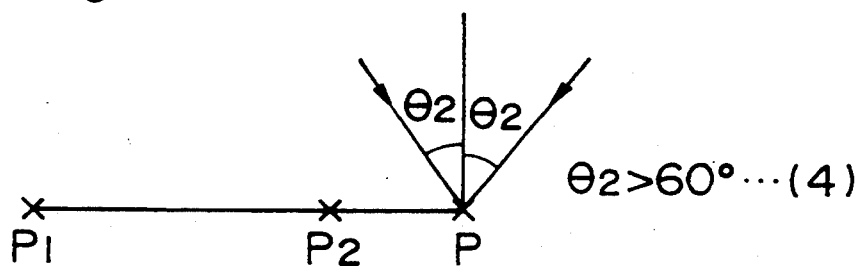
FIG. 8 is a explanatory drawing to explain the second embodiment of the measuring method of the coordinate measuring machine according to the present invention.
Figure 9:
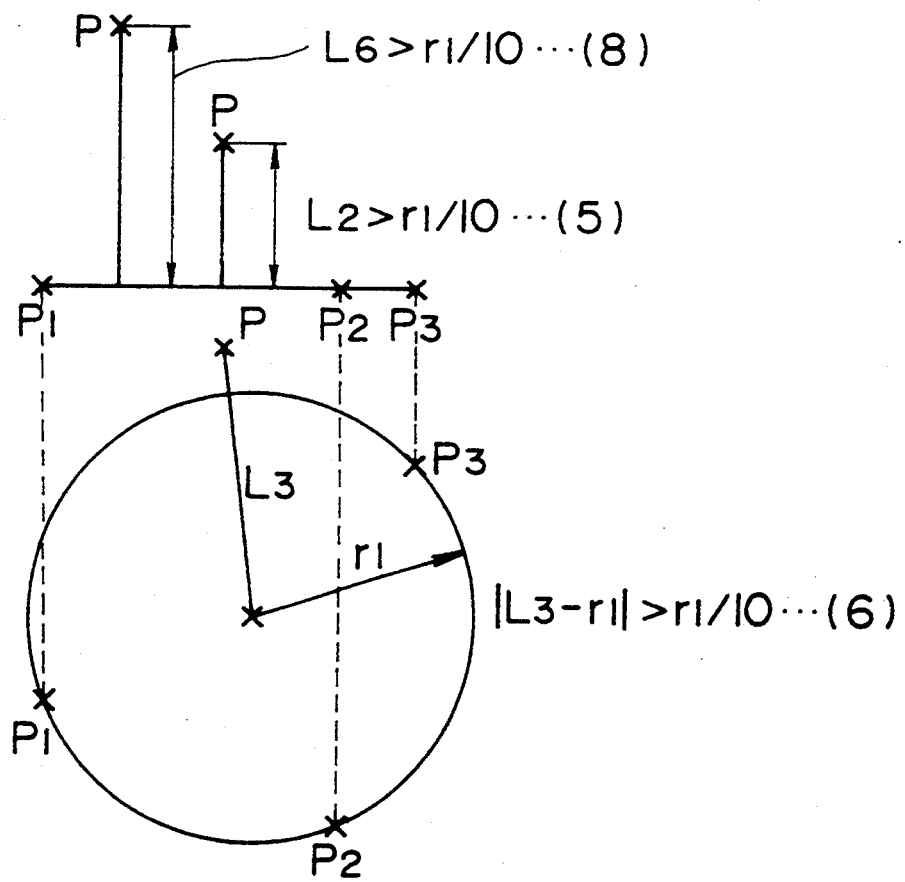
FIG. 9 is a explanatory drawing to explain the second embodiment of the measuring method of the coordinate measuring machine according to the present invention.
Figure 10:
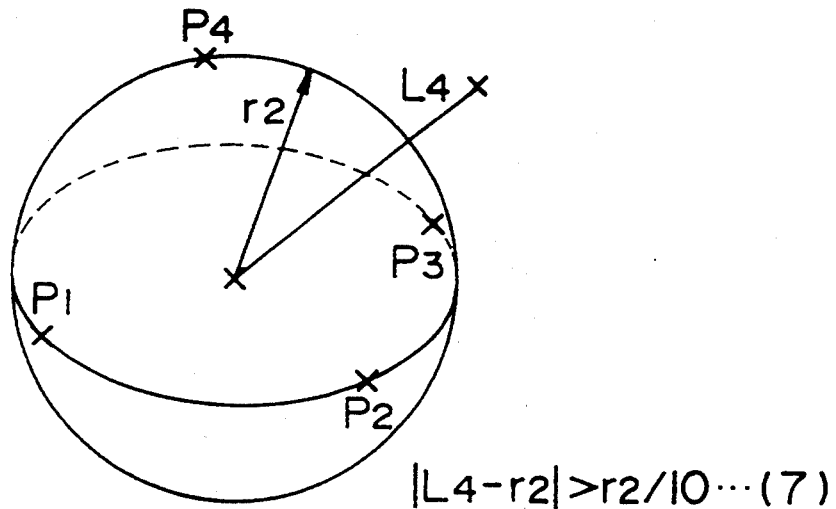
FIG. 10 is a explanatory drawing to explain the second embodiment of the measuring method of the coordinate measuring machine according to the present invention.
Figure 11:
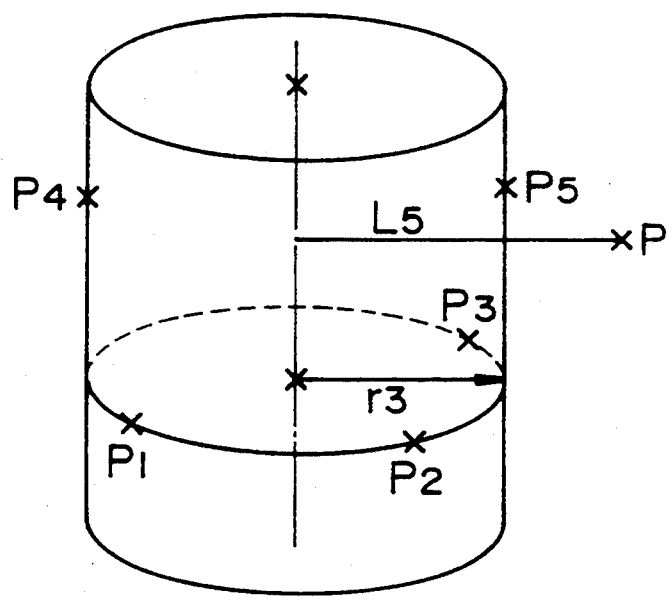
FIG. 11 is a explanatory drawing to explain the second embodiment of the measuring method of the coordinate measuring machine according to the present invention.

The geometric shape recognition part 46 compares all shape errors of "straight line, circle, ellipse, sphere, plane, cylinder and cone" which are memorized in the geometric shape calculation part 44 to recognize the minimum one as the optimal geometric shape. For instance, when the measured values of the geometric shape of the workpiece 48 are $P_1$–$P_6$ as shown in FIG. 3, the maximum shape errors $L_1$ of "straight line", the maximum shape errors $L_2$ of "circle" and the maximum shape errors of the other geometric shape (not shown) are calculated. And, when $L_1$ of "straight line" is the smallest among the calculated maximum shape errors, the geometric shape of the workpiece 48 is recognized as "a straight line". Moreover, the geometric shape recognition part 46 recognizes the optimal geometric shape in consideration of the measuring direction of the probe 36 which the data receiving part 42 detected. For instance, as shown in FIG. 4, the recognition of geometric shape will be changed to "a plane", even if the geometric shape is recognized as "a circle" or "an ellipse" on the basis of the maximum shape errors of the geometric shape of the workpiece 48 calculated from the measured values $P_1$–$P_4$ of the geometric shape and if there is a vertical direction against the plane of "the circle" or "the ellipse" among the plural measuring directions of the probe 36.

And, the geometric shape data which is recognized in the geometric shape recognition part 46 is displayed by a data display part 50.

The measuring method of using the first embodiment of the coordinate measuring machine having the above-described constructions according to this invention will be described on the basis of the flow chart of FIG. 5.

At first, the workpiece 48 is measured and the measured value and the signal of the direction of the probe 36 are sent into the data receiving part 42 (step 60). Next, it is judged whether the signal of the number of the data of the measured value sent into the data receiving part 42 is one or not (step 62). When the number of the data of the measured value is one, the geometric shape of the workpiece 48 is set as "a point" (step 62). On the other hand, when the number of the data of the measured value are plural, the following calculation is performed in the geometric shape calculation part 44 and the result thereof is memorized (Step 66–78).

That is, at first, the geometric shape of the workpiece 48 is calculated as "a straight line" to memorize the straightness thereof (Step 66), next, the geometric shape of the workpiece 48 is calculated as "a circle" to memorize the roundness thereof (Step 68). Then, the geometric shape of the workpiece 48 is calculated as "an ellipse", "a sphere" or "a plane", and the shape errors of "ellipse", the sphericity of "sphere" and the flatness of "plane" are memorized individually (step 70, 72, and 72). The cylindricity which is calculated on condition that the geometric shape of the workpiece 48 is "a cylinder" is memorized (step 76), the shape errors which are calculated on condition that the geometric shape of the workpiece 48 is "cone" is memorized (step 78).

Next, the geometric shape recognition part 46 compares all shape errors of "straight line, circle, ellipse, sphere, plane, cylinder and cone" to recognize the minimum one as the optimal geometric shape (Step 80). And, for instance, when the geometric shape of the workpiece 48 is recognized as "a circle" or "an ellipse" in the step 80, it is judged whether there is a vertical direction against the plane of "the circle" or "the ellipse" among the plural measuring direction of the probe 36 (Step 82).

When the measuring direction of the probe 36 is judged to be a vertical direction against the plane of "the circle" or "the ellipse" in the step 82, the geometric shape recognition of the workpiece 48 is changed for "a plane" (Step 84). Next, it is judged whether the ratio between the short and the long sides in the measuring range of the geometric shape changed for "a plane" is within a predetermined value (Step 86). And, when the ratio between the short and the long sides is judged to be within the predetermined value, the geometric shape recognition of the workpiece 48 is changed for "a straight line" (Step 88) and the changed data of "the straight line" is displayed (Step 90).

On the other hand, when it is not judged that the measuring directions of the probe 36 are vertical to each other, "NO" is judged in the step 86 and the data of one geometric shape of "the straight line, circle, ellipse, sphere, plane, cylinder and cone" which is recognized in the step 80 is displayed (step 90).

More, when the geometric shape of the workpiece 48 is set as "a point" in the step 62, "NO" is judged in the steps 82 and 86 and the data of "the point" is displayed (step 90).

Description has been given of the case in which the shape errors of seven types of geometric shape "a straight line, circle, ellipse, sphere, plane, cylinder and cone" are compared to recognize the geometric shape with the minimum shape errors as the optimal geometric shape in the first embodiment, however, the present invention should not necessarily be limited to this, and the geometric shape may contain at least two of these: "straight line, circle, ellipse, sphere, plane, cylinder and cone".

Moreover, description has been given of the case in which the shape errors of all geometric shape are calculated on the basis of all definite measured points after the measure is completed, afterwards, the geometric shape with a minimum shape errors among all shape errors is recognized as the geometric shape of the workpiece 48 in the first embodiment, however, the present invention should not necessarily be limited to this, and the geometric shape of the workpiece 48 may be gradually recognized on the basis of each characteristic of the geometric shape whenever the definite measured point is obtained, as shown in the second embodiment.

As above-described, the geometric shape is gradually recognized whenever the definite measured point is obtained, whereby the recognition time of the geometric shape can be shortened than the first embodiment.

Hereafter, detailed description will given of the second embodiment of the coordinate measuring machine and the method of measuring therein.

A 3-dimensions coordinate measuring machine of the second embodiment is common to the 3-dimensions coordinate measuring machine 10 of the first embodiment shown in FIG. 1. That is, the 3-dimensions coordinate measuring machine of the second embodiment is provided with the data receiving part 42, the geometric shape calculation part 44 and the geometric shape recognition part 46.

The data receiving part 42, as well as the first embodiment, detects the moving direction of the probe 36 and the contact position of the probe 36 when the probe 36 is brought into contact with the workpiece 48, that is, the measured value of the workpiece 48. Moreover, the data receiving part 42 outputs the signals of the detected moving direction of the probe 36 and the measured value of the workpiece 48 in the geometric shape recognition part 46. Further, the signal of the measured value of the workpiece 48 is output from the data receiving part 42 to the geometric shape calculation part 44.

As well as the first embodiment, the formulae which represent seven types of the geometric shape "a straight line, circle, ellipse, sphere, plane, cylinder and cone" are input previously. And, the signal of the geometric shape which is recognized in the geometric shape recognition part 46 is input to the the geometric shape calculation part 44. With this arrangement, the geometric shape calculation part 44 calculates a recognized geometric shape on the basis of the measured value, the recognized geometric shape and the input formulae which represent seven types of the geometric shapes. That is, when the geometric shape of the workpiece 48 is recognized as "a straight line", "the straight line" is calculated, and when the geometric shape of the workpiece 48 is recognized as "a circle", "the circle" is calculated. And, when the geometric shape of the workpiece 48 is recognized as "an ellipse", "a sphere" or "a plane", "the ellipse", "the sphere" or "the plane" is calculated individually. Moreover, when the geometric shape of the workpiece 48 is recognized as "a cylinder", "the cylinder" is calculated, and when the geometric shape of the workpiece 48 is recognized as "a cone", "the cone" is calculated. Further, when the number of the measured value of the workpiece 48 is one, the geometric shape of the workpiece 48 is recognized as "a point".

The geometric shape recognition part 46 recognizes the geometric shape of the workpiece 48 whenever the definite measured point of the geometric shape of the workpiece 48 is obtained, on the basis of the moving direction of the probe 36 and the measured value of the workpiece 48 which is input from the data receiving part 42.

Hereafter, description will be given of the patterns which the geometric shape recognition part 46 recognizes the geometric shape of the workpiece 48, based on FIGS. 6–11.

At first, when the definite measured point of the geometric shape of the workpiece 48 is one, the geometric shape recognition part 46 recognizes the geometric shape as "a point". When the definite measured points are two (P$_1$,P), the geometric shape is recognized as "a point" or "a straight line" depending on the magnitude of the distance L$_1$ (Refer to FIG. 6) between the two measured points. Moreover, when the definite measured points are three (P$_1$,P$_2$,P), the geometric shape recognition part 46 recognizes the geometric shape as "a straight line" or "a plane" depending on the magnitude of the triangular area S formed by the three definite measure points (Refer to FIG. 7) and the magnitude of the angle $\theta_1$ made by the vectors of $\overline{P_1P_2}$ and $\overline{P_1P}$. And, when the geometric shape is recognized as "a plane", the geometric shape is recognized again as "a plane" or "a circle" depending on the magnitude of the angle $\theta_2$ (Refer to FIG. 8) made by the moving direction of the probe 36 when a definite measured value P is measured newly and a normal line of "the plane" formed by three points.

Further, when the definite measured points are four, the geometric shape recognition part 46 judges the magnitude of the distance L$_2$ (Refer to FIG. 9) from "Plane" formed by three points (P$_1$,P$_2$,P$_3$) to the new definite measured point P. And, when the distance L$_2$ is larger than a predetermined value, the geometric shape which is recognized as "a plane" or "a circle" when three points are measured is recognized again as "a ball". Moreover, when the distance L$_2$ is smaller than the predetermined value, the geometric shape which is recognized as "a circle" when three points are measured is recognized again as "an ellipse" or "a circle" depending on whether the magnitude of the difference |L$_3$−r$_1$| (refer to FIG. 9) between the distance L$_3$ from the center of "the circle" formed by three points (P$_1$,P$_2$,P$_3$) to the new definite measured point P and the radius r$_1$ of "the circle" is within a predetermined value or not.

Moreover, when the definite measured point is five, the geometric shape of "the ball" which is recognized when four points are measured is recognized again as "a cylinder" or "a sphere" depending on whether the difference |L$_4$−r$_2$| (Refer to FIG. 10) between the distance L$_4$ from the center of "Ball" formed by four points (P$_1$-P$_4$) to the fifth new definite measured point P and the radius r$_2$ of "the ball" is within a predetermined value or not.

Figure 12:
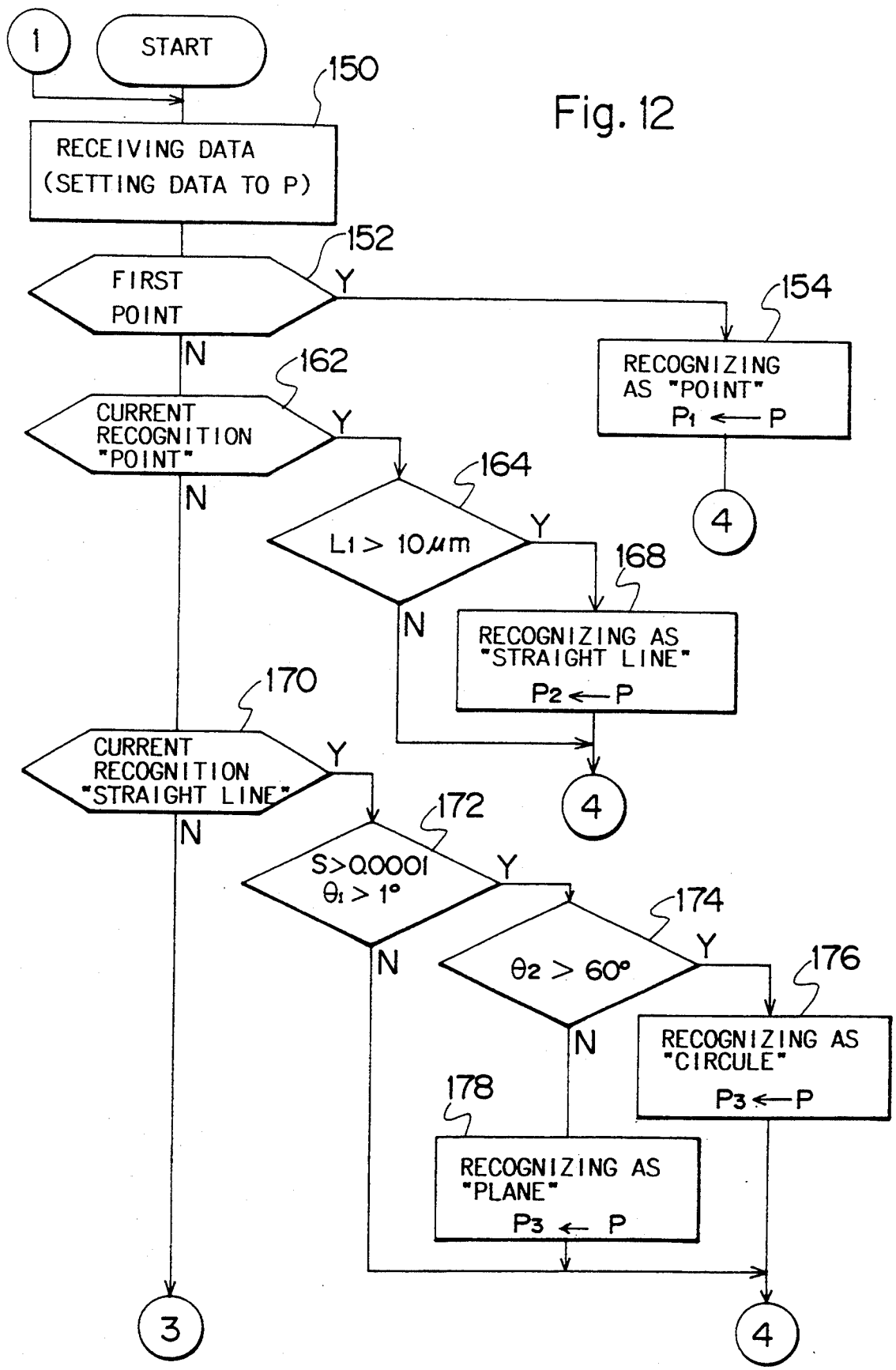
FIG. 12 is a flow chart to explain the second embodiment of the measuring method of the coordinate measuring machine according to the present invention.
Figure 13:
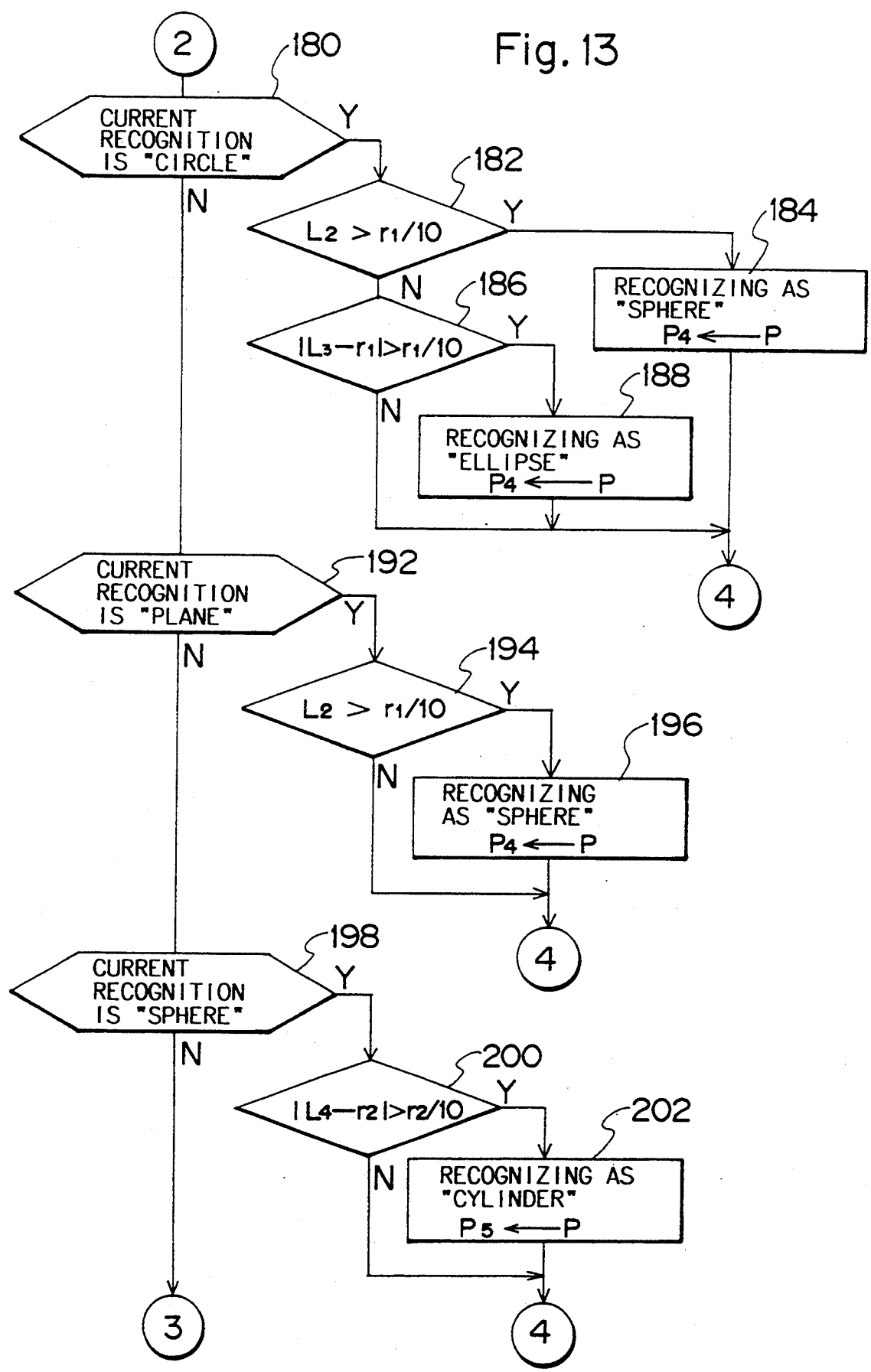
FIG. 13 is a flow chart to explain the second embodiment of the measuring method of the coordinate measuring machine according to the present invention.
Figure 14:
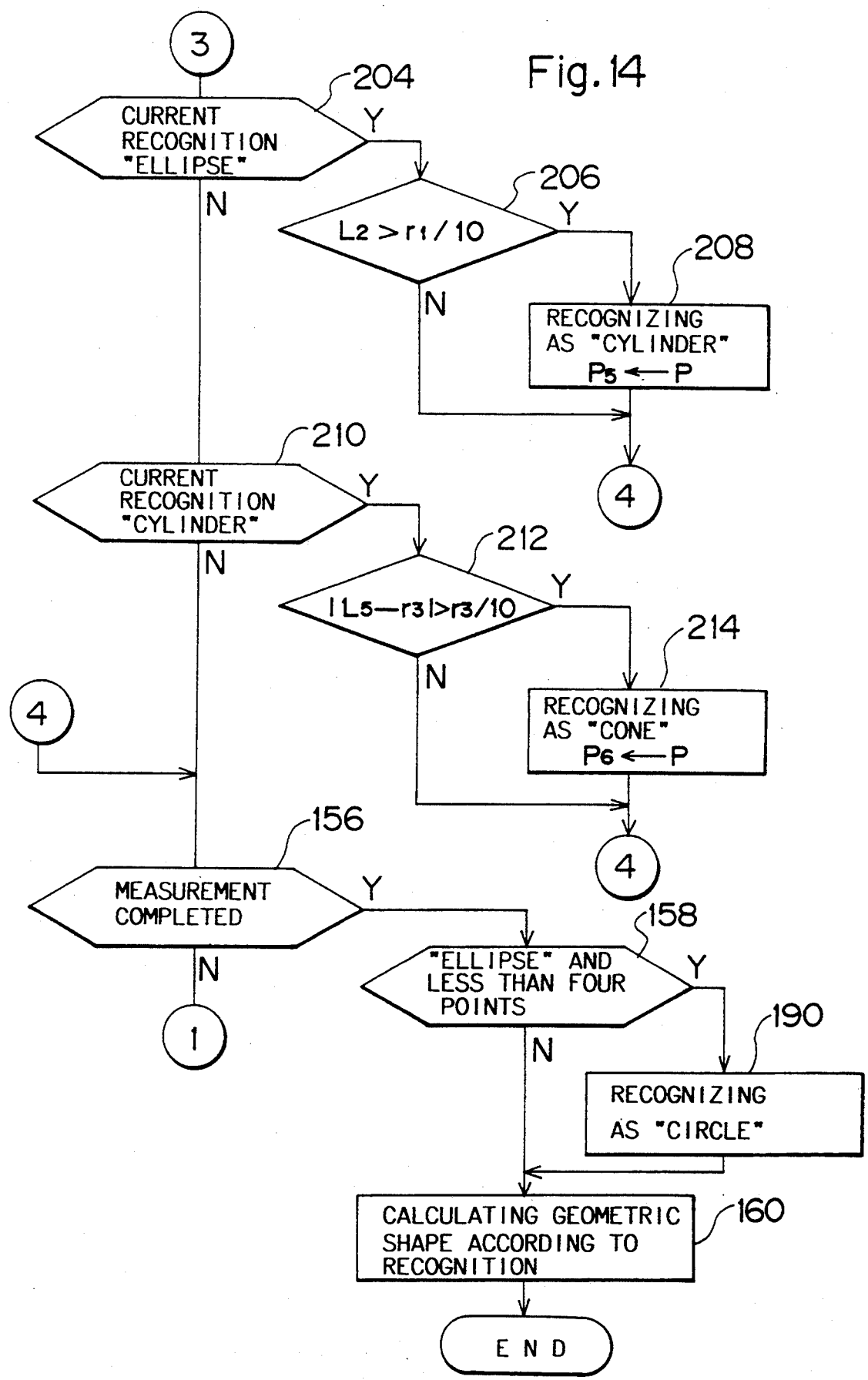
FIG. 14 is a flow chart to explain the second embodiment of the measuring method of the coordinate measuring machine according to the present invention.

Further, when the definite measured point is six, the geometric shape of "the cylinder" which is recognized when five points are measured is recognized again as "a cone" or "a cylinder" depending on whether the difference |L$_5$−r$_3$| (refer to FIG. 11) between the distance L$_5$ from the center of "cylinder" formed by five points (P$_1$-P$_5$) to the sixth new definite measured point P and the radius r$_3$ of "the sphere" is within a predetermined value or not. And, the geometric shape recognition part 46 inputs the recognized geometric shape to the geometric shape calculation part 44. The measuring method of using the second embodiment of the coordinate measuring machine having the above-described constructions according to this invention will be described on the basis of the flow chart of FIGS. 12-14.

At first, the signal of the definite measured value and the measuring direction of the probe 36 which are obtained by measuring the workpiece 48 are sent to the data receiving part 42. Further, the definite measured value which is sent is set as P (step 150). Next, it is judged whether the definite measured value is one point (step 152). When the definite measure value is one point, the geometric shape of the workpiece 48 is recognized as "a point" and the definite measured value P is set as P$_1$ (step 152). Then, it is judged whether the measure is completed (Step 156). When the measure is judged to be completed, it is judged whether the recognized geometric shape is "an ellipse" and the definite measured point is four points or less (Step 158). In this case, the geometric shape which is recognized presently is "a point". Therefore, geometric shape is recognized again as "point" in the step 160.

On the other hand, when the measure is judged not to be completed, the step is fed back to step 150. Then the workpiece 48 is newly measured, and the signal of the definite measured value and the measuring direction of the probe 36 is sent to the data receiving part 42. Further, the sent definite measured value is set as P (step 150). Next, when it is judged that the definite measured value is not one point (that is, it is plural) in the step 152, it is judged whether the geometric shape, which is recognized presently in the step 162, is "a point". And, when the geometric shape is recognized presently as "a point", a distance L$_1$ between P and P$_1$ is calculated and it is judged whether the distance L$_1$ meets the following formula (1) (Refer to FIG. 6)(step 164).

$$L_1 > 10 \; \mu m \tag{1}$$

And, when the relation of L$_1$>10 μm is met, the geometric shape of the workpiece 48 is recognized presently as "a straight line" and a new definite measured value is set as P$_2$ (step 168). Moreover, when judged that the relation of L$_1$>10 μm is not met in the step 164, the geometric shape of the workpiece 48 is recognized as "a point". Next, the measure is judged whether to be completed in the step 156, and when it is judged to be completed, it is judged that the geometric shape is recognized presently as "an ellipse" and the definite measured point is four points or less (step 158). And, when the geometric shape is recognized presently as "a straight line", the shape of "the straight line" is calculated in the step 160. When recognized presently as "a point", "the point" is recognized again in the step 160.

On the other hand, when the measure is judged not to be completed in the step 156, the step is fed back to step 150 again. Then the workpiece 48 is newly measured, and the signal of the definite measured value and the measuring direction of the probe 36 is sent to the data receiving part 42. Further, the definite measured value sent is set as P (step 150). Next, when the definite measured value is judged not to be one point (that is, it is plural) in the, step 152, it is judged whether the geometric shape, which is recognized presently in the step 162, is "a point".

When the geometric shape recognized presently is judged as "a point", the above-mentioned steps are repeated one by one. When it is not judged as "a point", it is judged whether the geometric shape recognized present in the step 170 is "a straight line". And, when the geometric shape recognized presently is judged as "a straight line", it is judged whether the area S formed by $P_1$, $P_2$ and P meets the following formula (2) (refer to FIG. 7) and the angle $\theta_1$ made by straight lines $P_1P_2$ and $P_1P$ meets the following formula (3) (refer to FIG. 7)(step 172).

$$S > 0.0001 \text{ mm}^2 \quad (2)$$

$$\theta_1 > 1° \quad (3)$$

When the relations of the formulae (2) and (3) are not met, the geometric shape of the workpiece 48 formed by the three points, $P_1$, $P_2$, and P is recognized as "a straight line". When the relations of the formulae (2) and (3) are met, it is judged whether the angle $\theta_2$ made by the normal line of the plane formed by the three points, $P_1$, $P_2$, and P and the moving direction of the prove 36 when P is measured meets the following formula (4) (refer to FIG. 8) (step 174).

$$\theta_2 > 60° \quad (4)$$

And when the relation of $\theta_2 > 60°$ is met, the geometric shape of the workpiece 48 recognizes as "a circle" and the new definite measured value P is set as $P_3$ (step 176). When the relation of $\theta_2 > 60°$ is not met, the geometric shape of the workpiece 48 recognizes as "a plane" and the new definite measuring value P is set as $P_3$ (step 178). Next, the measure is judged whether to have been completed. When the measure is judged to have been completed, it is judged whether the geometric shape recognized presently is "an ellipse" and the definite measured point are four points or less (step 158). And, when the geometric shape is recognized presently as "a circle", the geometric shape of "the circle" is calculated in the step 160. When recognized presently as "a plane", the geometric shape of "the plane" is calculated in the step 160. When recognized presently as "a straight line", the geometric shape of "the straight line" is calculated in the step 160.

On the other hand, when judged that the measure has not been completed in the step 156, the step is fed back to the step 150 again and the new definite measured value which is obtained when the workpiece 48 is measured newly and the measuring direction of the probe 36 are input into the data receiving part 42. Further, the input measured value is set as P (step 150). When judged that the conditions of the steps 152, 162 and 170 are not met individually, it is judged whether the geometric shape recognized presently is "a circle" in the step 180.

When judged as "a circle", it is judged whether the distance $L_2$ between from the plane formed by $P_1$, $P_2$, and $P_3$ to the new definite measured value P is met the following formula (5) (refer to FIG. 9) (Step 182).

$$L_2 > (\text{the radius } r_1 \text{ of the circle formed by } P_1\text{-}P_3)/10 \quad (5)$$

When the relation of the formula (5) is met, the geometric shape of the workpiece 48 is recognized as "a sphere" and the new definite measured value P is set as $P_4$ (step 184). One side, when the relation of the formula (5) is not met, it is judged whether the difference $|L_3 - r_1|$ between the distance $L_3$ from the center of the circle formed by $P_1$, $P_2$ and $P_3$ to the new definite measure value P and the radius $r_1$ of the circle formed by $P_1$, $P_2$ and $P_3$ is met the following formula (6) (Refer to FIG. 9)(Step 186).

$$|L_3 - r_1| > (\text{the radius } r_1 \text{ of the circle formed by } P_1\text{-}P_3)/10 \quad (6)$$

When the relation of the formula (6) is not met, the geometric shape of the workpiece 48 is recognized as "a circle". When the relation of the formula (6) is met, the geometric shape of the workpiece 48 is recognized as "an ellipse" (step 188). Next, the measure is judged whether to be completed in the step 156. When judged that the measure is completed, it is judged whether the geometric shape is recognized presently as "ellipse" and the definite measure point are four points or less (step 158). In this case, the geometric shape is recognized presently as "an ellipse" in the step 188. Therefore, when the definite measured point is judged to be four or more in the step 158, the shape of "the ellipse" is calculated in the step 160. Moreover, when the definite measure point is judged to be four or less in the step 158, the geometric shape is recognized presently as "a circle" in the step 190 and the shape of "the circle" recognized presently is calculated in the step 160. Further, the geometric shape is judged as "a sphere" or "a circle" individually in the steps 184 and 186, the shape "the sphere" or "the circle" is calculated individually in the step 160.

Next, when judged that the geometric shape recognized presently is "a plane" in the step 180, it is judged whether the distance $L_2$ between from the plane formed by $P_1$, $P_2$ and $P_3$ to the new definite measured value P meets the following formula (5) (refer to FIG. 9) (step 194).

$$L_2 > (\text{radius } r_1 \text{ of circle formed by } P_1\text{-}P_3)/10 \quad (5)$$

When the relation of formula (5) is met, the geometric shape of the workpiece 48 is recognized as "a sphere" and the new definite measured value P is set as $P_4$ (step 196). And, when the relation of formula (5) is not met, the geometric shape of the workpiece 48 is recognized as "a plane".

Next, it is judged whether the measure has been completed. When judged that the measure has been completed, it is judged whether the geometric shape is recognized presently as "an ellipse" and the definite measured points are four or less (step 158). In this case, the geometric shape is recognized presently as "a plane" or "a sphere" in the step 194 or 196. Therefore, the shape of "the plane" or "the sphere" is calculated in the step 160. Next, when judged that the measure has not been completed, the step is fed back to the step 150 again. The new definite measured value and the measuring direction of the probe 36 which are obtained when the workpiece 48 is measured newly are input into the data receiving part 42. Further, the input definite measured value is set as P (step 150). Then, when judged that the conditions are not met individually in the step 152, 162, 170, 180 or 192, it is judged whether the geometric shape is recognized present as "a sphere" in the step 198 (step 198).

When judged to be "a sphere", it is judged whether the difference $|L_4 - r_2|$ between the distance $L_4$ from the center of the sphere formed by $P_1$-$P_4$ to the definite measured value P and the radius $r_2$ of the sphere is met the following formula (7) (refer to FIG. 10) (step 200).

$$|L_4-r_2|>(\text{the radius } r_2 \text{ of the sphere formed by } P_1-P_4)/10 \qquad (7)$$

When the formula (7) is not met, the geometric shape of the workpiece 48 is recognized as "a sphere", and when the formula (7) is met, the geometric shape of the workpiece 48 is recognized as "a cylinder" and the new definite measured value P is set as $P_5$ (step 202). Next, the measure is judged whether to have been completed in the step 156. When it is judged to have been completed, it is judged whether the geometric shape is recognized presently as "an ellipse" and the definite measured points are four or less (step 158). In this case, the geometric shape is recognized presently as "a sphere" or "an ellipse" in the steps 200 and 202. Therefore, the shape of "the sphere" or "the ellipse" is calculated in the step 160.

When the geometric shape is not judged as "a sphere" in the step 198 and is judged as "an ellipse" in the step 204, it is judged whether the distance $L_6$ from the plane formed by $P_1-P_3$ to the definite measured value P meets the following formula (9) (step 206).

$$L_6>(\text{the radius } r_1 \text{ of the circle formed by } P_1-P_3)/10 \qquad (8)$$

And, when the relation of formula (8) is not met, the geometric shape of the workpiece 48 is recognized as "an ellipse". When the relation of formula (8) is met, the geometric shape of the workpiece 48 is recognized as "a cylinder" and the new definite measured value P is set as $P_5$ (step 208). Next, the measure is judged whether to have been completed in the step 156. When the measure is judged to have been completed, it is judged whether the geometric shapes is recognized presently as "an ellipse" and the definite measured points are four or less (step 158). In this case, geometric shape is recognized presently as "an ellipse" or "a cylinder" in the step 206 and 208. Therefore, the shape of "the ellipse" or "the cylinder" is calculated in the step 160.

Next, when the measure is judged not to have been completed, the step is fed back to the step 150 again. The new definite measured value and the measuring direction of the probe 36 which are newly obtained by measuring the workpiece 48 are input into the data receiving part 42. Further, the taken definite measured value is set as P (step 150). When judged that the conditions are not met, individually in the steps 152, 162, 170, 180, 192, 198 and 204, it is judged whether the geometric shape which is recognized presently in the step 210 is "a cylinder". When the geometric shape is judged to be recognized as "cylinder", it is judged whether the difference $|L_5-r_3|$ between the distance $L_5$ from the center of the cylinder formed by $P_1-P_5$ to the new definite measured value P and the cylinder radiuses $r_3$ meets the following formula (9) (refer to FIG. 11)(Step 212).

$$|L_5-r_3|>(\text{the radius } r_3 \text{ of the cylinder formed by } P_1-P_5)/10 \qquad (9)$$

And, when formula (9) is not met, the geometric shape of the workpiece 48 is recognized as "a cylinder". When formula (9) is met, the geometric shape of the workpiece 48 is recognized as "cone" and the new definite measured value P is set as $P_6$ (step 212). Next, the measure is judged whether to have been completed in the step 156. When the measure is judged to have been completed, it is judged whether the geometric shapes is recognized presently as "an ellipse" and the definite measured points are four or less (step 158). In this case, the geometric shape is recognized presently as "a cylinder" or "a cone" in the steps 212 and 214. Therefore, the shape of "the cylinder" or "the cone" is calculated in the step 160.

Next, when the measure is judged not to have been completed in the step 156, the step is fed back to step 150 again and the above-mentioned steps are repeated one by one.

As has been described herein before, in the coordinate measuring machine and the method of therein according to this invention, the measuring direction of the measuring element and the measured value when the probe comes in contact with the workpiece are taken. Then, respective errors are calculated on the basis of the taken measured value of the workpiece and the formulae which were input previously and represent the geometric shapes of "a straight line, circle, ellipse, sphere, plane, cylinder and cone". And, the respective calculated shape errors of "the straight line, circle, ellipse, sphere, plane, cylinder, and cone" is compared and the geometric shape having the lowest shape errors is recognized. Further, the optimal geometric shape is recognized again on the basis of the geometric shape having the lowest recognized shape errors and the measuring direction of the measuring element which is input from the data receiving part.

Therefore, the step which the key is input by selecting the geometric shape of the workpiece before measuring from eight types of "a point, straight line, circle, ellipse, sphere, plane, cylinder and cone" can be removed, whereby the mistake instruction of the geometric shape of the workpiece can be prevented and the geometric shape of the workpiece can be measured without interrupting the joystick operation.

Moreover, in the coordinate measuring machine and the method of measuring therein according to this invention, the geometric shape recognition part adds a new data of the measured value and the moving direction of the measuring element which is input from the data receiving part to a current data whenever the definite measuring point of the geometric shape of the workpiece is obtained. Then, the geometric shape of the workpiece is recognized on the basis of the characteristic of "a point, straight line, circle, ellipse, sphere, plane, cylinder and cone" according to this current data and the new data.

Thus, since the geometric shape of the workpiece can be automatically set on the basis of the characteristic of "point, straight line, circle, ellipse, sphere, plane, cylinder and cone" whenever the definite measured point of the geometric shape of the workpiece is obtained, the geometric shape can be recognized in a short time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A coordinate measuring machine wherein a measuring element is brought into contact with a workpiece which is placed on a table to measure the shape of the workpiece, comprising:

a data receiving device recording at least one measured value and a measuring direction of the measuring element when the measuring element is brought into contact with a workpiece;

a shape error calculating device receiving the at least one measured value from the data receiving device and having stored therein a plurality of formulae representing a corresponding plurality of geometric shapes, the shape error calculating device calculating shape errors based on the plurality of formulae and the at least one measured value from the data receiving device;

a geometric shape determining device for determining a geometric shape of the workpiece based on the number of measured values and amount of shape errors from the plurality of formulae, the geometric shape determining device determining the geometric shape to be a point when the number of measured values is one, the geometric shape determining device comparing the shape errors calculated by said shape error calculating device for at least two geometric shapes when the number of measured values is more than one to determine a temporary geometric shape having the least shape error and determining an optimal geometric shape based on the temporary geometric shape and the measuring direction of the measuring element recorded by the data receiving device when the number of measured values is more than one; and a data display device displaying one of the temporary and optimal geometric shapes.

2. The coordinate measuring machine of claim 1, wherein said shape error calculating device calculates shape errors based on the straightness of a straight line, the roundness of a circle, the elliptical shape error of an ellipse, the sphericity of a sphere, the flatness of a plane, the cylindricity of a cylinder, and the conical shape error of a cone.

3. The coordinate measuring machine of claim 1, wherein:

when a first measured value is recorded by the data receiving device, the first measured value is set as a first distinctive point and the geometric shape determining device determines the temporary geometric shape to be a point;

when a second measured value is recorded by the data receiving device, the second measured value is set as a second distinctive point, and the geometric shape determining device determines the optimal geometric shape to be a line when a distance, L1, between said first and second distinctive points is greater than a first predetermined distance;

when a third measured value is recorded by the data receiving device, the third measured value is set as a third distinctive point and the geometric shape determining device determines the optimal geometric shape to be a plane when an angle, $\Theta 1$, between a line passing through said first and second distinctive points and a line passing through said first and third distinctive points is greater than a first predetermined angle, an area formed by a first triangle connecting said first, second, and third distinctive points is greater than a predetermined area, and an angle $\Theta 2$, between a normal line of said first triangle and the moving direction of said measuring element during recording of said third measured value is smaller than a second predetermined angle;

when a third measured value is recorded by said data receiving device, the third measured value is set as a third distinctive point, and the geometric shape determining device determines the optimal geometric shape to be a circle when an angle $\Theta 1$, between a line passing through said first and second distinctive points and a line passing through said first and third distinctive points is greater than a first predetermined angle, an area formed by a first triangle connecting said first, second, and third distinctive points is greater than a predetermined area, and an angle, $\Theta 2$ between a normal line of said first triangle and the moving direction of said measuring element during the recording of said third measured value is larger than said second predetermined angle;

when the geometric shape has been determined to be a circle, and a fourth measured value is recorded by said data receiving device the fourth measured value is set as a fourth distinctive point, and the geometric shape determining device determines the optimal geometric shape to be a sphere when a distance, L2, between said fourth distinctive point and the plane of a circle passing through said first, second and third distinctive points is larger than a second predetermined distance;

when the geometric shape has been determined to be a circle, and a fourth measured value is recorded by said data receiving device, the fourth measured value is set as a fourth distinctive point, and the geometric shape determining device determines the optimal geometric shape to be an ellipse when said distance, L2, between said fourth distinctive point and a circle passing through said first, second, and third distinctive points is smaller than said second predetermined distance and a distance, L3, between said fourth distinctive point and the circumference of a circle passing through said first, second and third distinctive points is larger than a third predetermined distance;

when the geometric shape has been determined to be a plane, and a fourth measured value is recorded by said data receiving device, the fourth measured value is set as a fourth distinctive point and the geometric shape determining device determines the optimal geometric shape to be a sphere when a distance, L4, between and said fourth distinctive point and a plane passing through said first, second and third distinctive points is larger than a fourth predetermined distance;

when the geometric shape has been determined to be a sphere, and a fifth measured value is recorded by said data receiving device, the fifth measured value is set as a fifth distinctive point and the geometric shape determining device determines the optimal geometric shape to be a cylinder when a distance, L5, between said fifth distinctive point and a surface of a sphere passing through said first, second, third and fourth distinctive points is larger than a fifth predetermined distance;

when the geometric shape has been determined to be an ellipse, and a fifth measured value is recorded by said data receiving device, the fifth measured value is set as a fifth distinctive point and the geometric shape determining device determines the optimal geometric shape to be a cylinder when a distance, L6, between said fifth distinctive point and the plane of an ellipse passing through said first, second, third, and fourth distinctive points is larger than a sixth predetermined distance; and when the geometric shape has been determined to be a cylinder, and a sixth measured value is recorded by said data receiving device, the sixth measured value is set as a sixth distinctive point and the geometric shape determining device determines the optimal geometric shape to be a cone when a distance, L7, between said sixth distinctive point and the surface of a cylinder passing through said first, second, third, fourth, and fifth distinctive points is larger than a seventh predetermined distance.

4. The coordinate measuring machine of claim 3 wherein said first predetermined distance is 10 μm.

5. The coordinate measuring machine of claim 3 wherein said first predetermined angle is 1° and the predetermined area is 0.0001 mm².

6. The coordinate measuring machine of claim 3 wherein said second predetermined angle is 60°.

7. The coordinate measuring machine of claim 3 wherein said second predetermined distance is one tenth of a radius of a circle passing through said first, second, and third distinctive points.

8. The coordinate measuring machine of claim 7 wherein said third predetermined distance is one tenth of a radius of a circle passing through said first, second, and third distinctive points.

9. The coordinate measuring machine of claim 3 wherein said fifth predetermined distance is one tenth of a radius of a sphere passing through said first, second, third, and fourth distinctive points.

10. The coordinate measuring machine of claim 3 wherein said seventh predetermined distance is one tenth of a radius of a cylinder passing through said first, second, third, fourth and fifth distinctive points.

11. A method of determining a shape of a workpiece in a coordinate measuring machine having a data receiving device with a measuring element that contacts a surface of the workpiece to determine the shape, of the workpiece, the method comprising the steps of:

recording with a data receiving device at least one measured value and a measuring direction of the measuring element when the measuring element contacts the surface of the workpiece;

calculating shape errors with a shape error calculating device based on a plurality of formulae that each represent at least one geometric shape and the at least one recorded measured value from the data receiving device;

comparing the calculated shape errors with a geometric shape determining device;

determining a temporary geometric shape having the least shape error with said geometric shape determining device;

determining an optimal geometric shape based on the temporary geometric shape and the recorded measuring direction with said geometric shape determining device; and displaying one of the temporary and optimal geometric shapes on a data output part.

12. The method of claim 11 further comprising the steps of:

determining the temporary geometric shape with said geometric shape determining device to be a point when the number of measured values is one; and comparing the calculated shape errors of at least two geometric shapes with said geometric shape determining device when the number of measured values is more than one.

13. The method of claim 11, further comprising the steps of:

determining the temporary geometric shape to be a point and setting a first measured value as a first distinctive point with said geometric shape determining device when the number of measured values is one;

determining the optimal geometric shape to be a straight line and setting a second measured value as a second distinctive point with said geometric shape determining device when the second measured value is input after the first measured value and a distance, L1, between said first and second distinctive points is greater than a first predetermined distance;

determining the optimal geometric shape to be a plane and setting a third measured value as a third distinctive point with said geometric shape determining device when the third measured value is input after the second measured value and an angle, Θ1, between a line passing through said first and second distinctive points and a line passing through said first and third distinctive points is greater than a first predetermined angle, an area formed by a triangle connecting said first, second, and third distinctive points is greater than a predetermined area, and an angle, Θ2, between a normal line of said triangle and the measuring direction of said measuring element during the recording of said third measured value is smaller than a second predetermined angle;

determining the optimal geometric shape to be a circle and setting the third measured value as the third distinctive point with said geometric shape determining device when the third measured value is input after the second measured value and an angle, Θ1, between a line passing through said first and second distinctive points and a line passing through said first and third distinctive points is greater than a first predetermined angle, an area formed by a triangle connecting said first, second, and third distinctive points is greater than a predetermined area, and an angle, Θ2, between a normal line of said triangle and the measuring direction of said measuring element during the recording of said third measured value is larger than said second predetermined angle;

determining the optimal geometric shape to be a sphere and setting a fourth measured value as the fourth distinctive point with said geometric shape determining device when the fourth measured value is input after the third measured value and the geometric shape was previously determined to be a circle and a distance, L2, between said fourth distinctive point and the plane of a circle passing through said first, second, and third distinctive points is larger than a second predetermined distance;

determining the optimal geometric shape to be an ellipse and setting the fourth measured value as the fourth distinctive point with said geometric shape determining device when the fourth measured value is input after the third measured value and the geometric shape was previously determined to be a circle, and said distance, L2, between said fourth distinctive point and the plane of a circle passing through said first, second, and third distinctive points is smaller than said predetermined distance and a distance, L3, between said fourth distinctive point and the circumference of the circle passing through said first, second, and third distinctive points is larger than a third predetermined distance;

determining the optimal geometric shape to be a sphere and setting the fourth measured value as the fourth distinctive point with said geometric shape determining device when a fourth measured value is input after the third measured value and the geometric shape was previously determined to be a plane and a distance, L4, between said fourth distinctive point and a plane passing through said first, second, and third distinctive points is larger than a fourth predetermined distance;

determining the optimal geometric shape to be a cylinder and setting a fifth measured value as the fifth distinctive point with said geometric shape determining device when the fifth measured value is input after the fourth measured value and the geometric shape was previously determined to be a sphere and a distance, L5, between said fifth distinctive point and the surface of a sphere passing through said first, second, third and fourth distinctive points is larger than a fifth predetermined distance;

determining the optimal geometric shape to be a cylinder and setting the fifth measured value as the fifth distinctive point with said geometric shape determining device when the fifth measured value is input after the fourth measured value and the geometric shape was previously determined to be an ellipse and a distance, L6, between said fifth distinctive point and a plane of an ellipse passing through said first, second, third, and fourth distinctive points is larger than a sixth predetermined distance; and determining the optimal geometric shape to be a cone and setting a sixth measured value as a sixth distinctive point with said geometric shape determining device when the sixth measured value is input after the fifth measured value and the geometric shape was previously determined to be a cylinder and a distance, L7, between said sixth distinctive point and a surface of a cylinder passing through said first, second, third, fourth and fifth distinctive points is larger than a seventh predetermined distance.

14. A method of determining a shape of a workpiece in a coordinate measuring machine having a data receiving device with a measuring element that contacts a surface of the workpiece to determine the shape of the workpiece, the method comprising the steps of:

recording at least one measured value and a measuring direction of the measuring element when the measuring element contacts the surface of the workpiece;

calculating shape errors based on a plurality of formulae representing plural geometric shapes and the at least one recorded measured value;

comparing the calculated shape errors;

determining a temporary geometric shape having the least shape error;

determining an optimal geometric shape based on the temporary geometric shape and the recorded measuring direction;

automatically setting the geometric shape of the workpiece in accordance with the optimal geometric shape; and displaying one of the temporary and optimal geometric shapes.

15. A method of determining a shape of a workpiece in a coordinate measuring machine having a data receiving device with a measuring element, the method comprising the steps of:

contacting a surface of the workpiece with the measuring element;

recording at least one measured value and a measuring direction of the measuring element when the measuring element contacts the surface of the workpiece;

calculating shape errors based on a plurality of formulae representing plural geometric shapes and the at least one recorded measured value;

comparing the calculated shape errors;

determining a temporary geometric shape having the least shape error; and determining an optimal geometric shape in accordance with the temporary geometric shape and the recorded measuring direction, wherein the shape of the workpiece is automatically set in accordance with the optimal geometric shape by the coordinate measuring machine.

* * * * *